July 23, 1963     O. A. TEACHWORTH     3,098,337
POWER LAWN MOWER GUARDS

Filed April 23, 1962     2 Sheets-Sheet 1

INVENTOR.
OSWALD A. TEACHWORTH
BY
*Everett F. Wright*
ATTORNEY

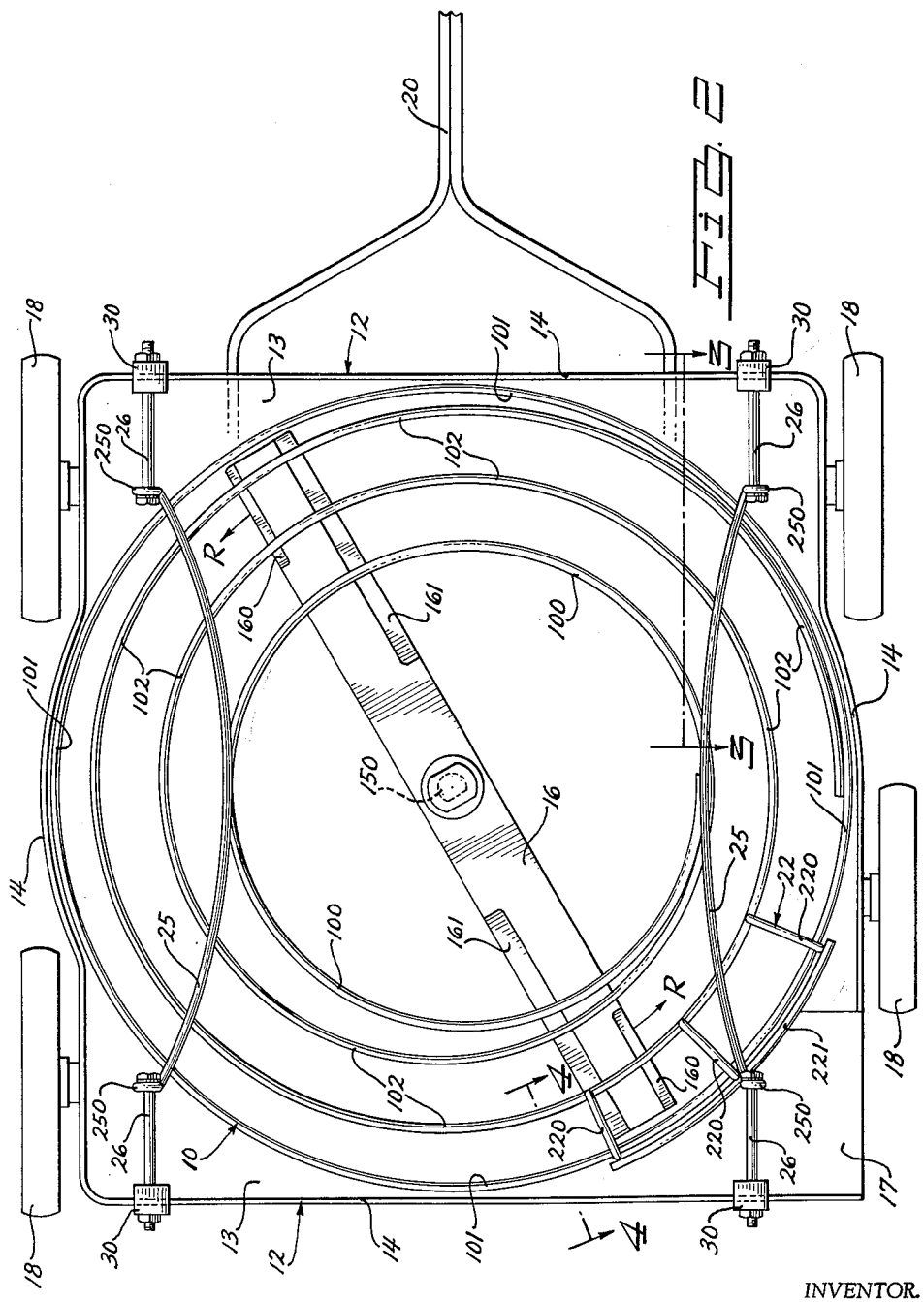

United States Patent Office 3,098,337
Patented July 23, 1963

3,098,337
POWER LAWN MOWER GUARDS
Oswald A. Teachworth, Holly, Mich., assignor of one-third to George J. Fulkerson, Birmingham, Mich., and one-third to Orin T. Fulkerson, Pontiac, Mich.
Filed Apr. 23, 1962, Ser. No. 189,520
6 Claims. (Cl. 56—25.4)

This invention relates to power lawn mower guards, and in particular to an improved guard for rotary type power lawn mowers.

Due to the breakage of the rotating blade of rotary lawn mowers caused generally by the lawn mower passing over foreign objects on a lawn while being cut, or as the result of the flinging of stones or metal objects over which a rotary type lawn mower passes during the cutting of a lawn, many both serious and minor injuries are sustained by the operators thereof and by persons or children nearby.

Many safety devices have been developed in an attempt to reduce the aforementioned hazards; however, none have proven entirely satisfactory because of being too costly or because of a decrease in efficiency occasioned by partial clogging of the rotary power mower equipped therewith.

Accordingly, the primary object of the instant invention is to provide an improved guard means for rotary type power lawn mowers which is highly effective to prevent injury to the operator of the power mower and nearby persons or pets in the event a foreign object is run over during the mowing of a lawn causing the breakage of the rapidly rotating cutting blade of the mower or the flinging of the foreign object by the said cutting blade.

A further object of the invention is to provide an improved guard means for rotary type power lawn mowers which may be simply and readily installed thereon either as original equipment or as an accessory.

Other objects of the invention will become apparent by reference to the following detailed description taken in connection with the accompanying drawings, in which:

FIG. 2 is an enlarged bottom view taken on the line 2—2 of FIG. 1.

Figure 1:
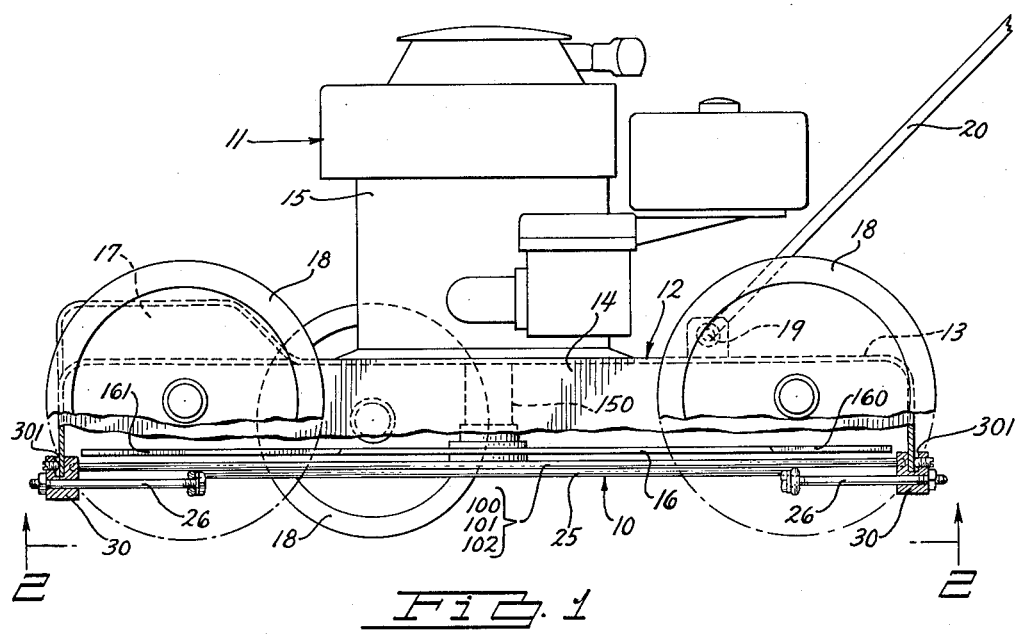
FIG. 1 is a side elevational view of a conventional rotary type power lawn mower upon which a guard embodying the invention has been installed.

Referring now to the drawings wherein like numerals refer to like and corresponding parts throughout the several views, the power lawn mower guard 10 illustrative of the invention is disclosed in connection with a typical power lawn mower 11 consisting of a housing 12 having a rectangular top 13 and a depending periphery 14. The usual motor or gasoline engine 15 is mounted on the top 13 of the housing 12 and has its driven shaft 150 extending therethrough. On the lower end of the said driven shaft 150 is keyed a cutter blade 16 having its cutting edge 160 disposed in the direction of its rotation as indicated by the arrows R. The trailing edge 161 of the cutter blade 16 is shown to be beveled in the usual manner. The housing 12 has the usual cut-grass outlet 17 formed through the side of the said housing 12 at the front thereof as best shown in FIGS. 1 and 2.

The power lawn mower 11 is provided with wheels 18 including conventional mechanism (not shown) for adjusting the wheels 18 to support the bottom of the lower depending periphery 14 of the housing 12 at a selected distance above the turf whereby to admit of cutting the grass at the desired height by the rotating cutter blade 16 when the engine 15 is running and the lawn mower 11 is pushed forwardly by means of a push bar 20 pivoted to the top of its housing 12 by pivots 19.

The power lawn mower guard 10 is preferably formed of wire and is disposed over the bottom of the housing 12 substantially at the level of the depending periphery 14 thereof. The said annular wire guard 10 has an outer periphery 101 and an inner periphery 100 with the distance between the said inner and outer annular peripheries 100 and 101 being preferably substantially the width or somewhat wider than the length of the cutting edge 160 of the cutter blade 16. The said annular wire guard 10 is provided with at least two generally spiral or circular wire turns 102 between the inner periphery 100 and the outer periphery 101 thereof. The space between the wire turns 102 and between the wire turns 102 and the inner and outer annular peripheries 100 and 101 of the annular wire guard 10 is such as to permit blades of grass to be cut by the power lawn mower 11 to extend upwardly therebetween into the path of the cutting edge 160 of the rapidly rotating cutting blade 16 thereof.

Figure 3:
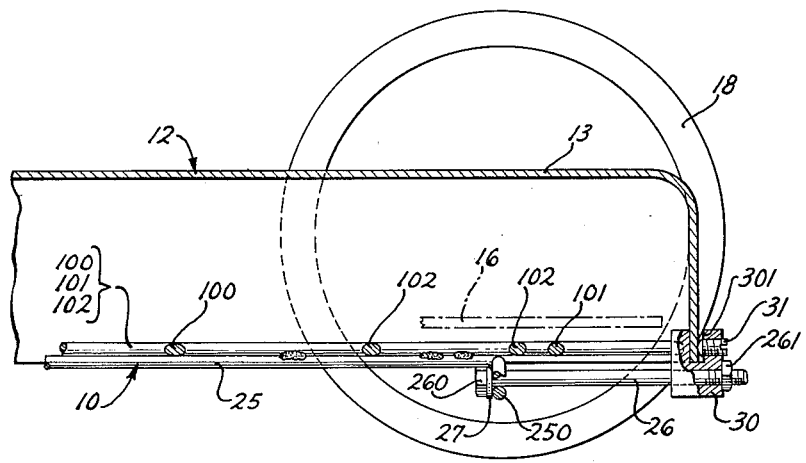
FIG. 3 is an enlarged detailed sectional view taken on the line 3—3 of FIG. 2.

The said annular guard 10 is suspended in a taut relationship across the bottom of the lawn mower housing 12 substantially at the level of the bottom of the depending periphery 14 thereof by such suitable means as a pair of horizontal preferably curved suspension wires 25 welded to the annular guard 10 at the inner and outer peripheries 100 and 101 thereof, and also welded to the spiral or circular wire turns 102 between the said inner periphery 100 and the outer periphery 101 of the said annular guard 10. In the particular suspension of the annular guard 10 shown in the drawings for illustrative purposes, the ends of the suspension wires 25 are looped at 250 to accommodate a suitable suspension bolt 26 which either may be connected to the depending periphery 14 of the housing 12 through holes (not shown) provided therein, or, by means of suitable anchor blocks 30. The head 260 of the suspension bolt 26 preferably abuts the loop 250 of the suspension wire 25 with a washer 27 therebetween as best shown in FIG. 3.

Each anchor block 30 is preferably formed of steel as shown or may be of a stamping or the like. The steel anchor block 30 is transversely grooved at 301 to fit over the bottom edge of the depending periphery or skirt 14 of a power lawn mower housing 12. Such means as a pair of set screws 31 threaded through the outside of the anchor block 30 into communication with the said groove 301 therein and into engagement with the depending periphery 14 of the lawn mower housing 12 may be employed to fix the anchor block 30 thereto. A suitable bore 302 is provided through each anchor block 30 to accommodate a suspension bolt 26 as best shown in FIGS. 1, 2 and 3. The tightening of the nut 260 of each suspension bolt 26, of which four are preferably employed, will pull the lawn mower guard taut so as to prevent the upward bending thereof into contact with the rotating cutter blade 16 if the lawn mower should be pushed over a foreign object or a small but relatively high mound of turf.

Figure 4:
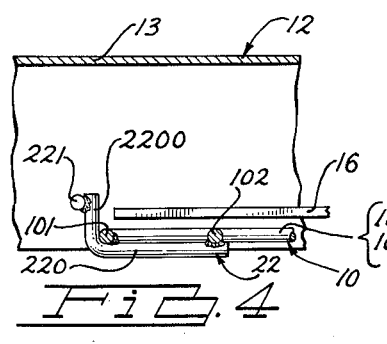
FIG. 4 is an enlarged detailed sectional view taken on the line 4—4 of FIG. 2.

To prevent a broken cutter blade from being thrown from the inside of the housing 12 of a power lawn mower 11 through the cut-grass outlet 17 thereof, an arcuate guard element 22 is preferably provided which consists of spaced L-shaped wire members 220 connected radially to and extending somewhat above the annular wire power lawn mower guard 10 opposite the said cut-grass outlet 17. A horizontally disposed arcuate trim wire 221 may be secured to the upwardly disposed end portion 2200 of the L-shaped wire members 220 as best shown in FIG. 4.

By the employment of relatively hard heavy gage wire in the construction of the power lawn mower guard 10, and securely welding all points of overlapping or juxtaposition of the wires forming the said guard 10, a very serviceable, long lasting and rugged unitary structure will result which will serve its intended function well.

Although but a single embodiment of the invention has been shown in the drawings and described in detail, it is obvious that many changes may be made in the size, shape, arrangement and detail of the various elements of the invention as defined by the appended claims.

I claim:

1. In a rotary type power lawn mower, a horizontally disposed rotating cutter blade and drive means therefor, said cutter blade having a cutting edge adjacent each end facing in the direction of rotation thereof, a housing over said rotating cutter blade including a depending periphery extending below said rotating cutter blade and having a cut grass outlet therein, and wheel means supporting the lower periphery of said housing at a selected distance above the turf whereby to admit of the cutting of grass by said rotating cutter blade, an annular wire guard disposed over the bottom of the said housing located substantially at the bottom of the depending periphery thereof, said annular guard having its outer periphery substantially coextensive of said housing with the distance between the inner annulus and outer periphery thereof being substantially the length of the cutting edge of said cutter blade, said annular guard including generally spirally disposed intermediate wires spaced sufficiently between the inner and outer peripheries thereof to permit blades of grass to be cut to extend upwardly therebetween in the path of the cutting edge of said cutter blade, a pair of spaced suspension wires fixed at the central portion thereof to the inner wire of said annular guard and at circularly spaced points to the intermediate and outer wires thereof, means connected to said suspension wires and to the depending peripheral portion of said housing at opposite sides thereof securing said annular guard in taut relationship to the housing.

2. In a rotary type power lawn mower, a horizontally disposed rotating cutter blade and drive means therefor, said cutter blade having a cutting edge adjacent each end facing in the direction of rotation thereof, a housing over said rotating cutter blade including a depending periphery extending below said rotating cutter blade and having a cut grass outlet therein, and wheel means supporting the lower periphery of said housing at a selected distance above the turf whereby to admit of the cutting of grass by said rotating cutter blade, an annular wire guard disposed over the bottom of the said housing located substantially at the bottom of the depending periphery thereof, said annular guard having its outer periphery substantially coextensive of said housing with the distance between the inner annulus and outer periphery thereof being at least the length of the cutting edge of said cutter blade, said annular guard including circular inner and outer wire formation connected with a spiral wire therebetween having a spacing between turns thereof sufficient to permit blades of grass to be cut to extend upwardly between said spiral wire turns into the path of the cutting edge of said cutter blade.

and means suspending the said annular guard in taut relationship to the depending peripheral portion of said housing.

3. In a rotary type power lawn mower, a horizontally disposed rotating cutter blade and drive means therefor, said cutter blade having a cutting edge adjacent each end facing in the direction of rotation thereof, a housing over said rotating cutter blade including a depending periphery extending below said rotating cutter blade and having a cut grass outlet therein, and wheel means supporting the lower periphery of said housing at a selected distance above the turf whereby to admit of the cutting of grass by said rotating cutter blade, an annular wire guard disposed over the bottom of the said housing located substantially at the bottom of the depending periphery thereof, said annular guard having its outer periphery substantially coextensive of said housing with the distance between the inner annulus and outer periphery thereof being substantially the length of the cutting edge of said cutter blade, said annular guard including generally circularly disposed intermediate wires spaced between the inner and outer peripheries thereof sufficiently to permit blades of grass to be cut to extend upwardly therebetween in the path of the cutting edge of said cutter blade, a pair of spaced suspension wires fixed to the inner circular wire of said annular guard and at circularly spaced points to the intermediate and outer circular wires thereof, loops formed at the ends of said suspension wires, and means disposed through said loops connecting the said annular wire guard to the depending peripheral portion of said housing at opposite sides thereof securing said annular guard in taut relationship to said housing.

4. In a rotary type power lawn mower, a horizontally disposed rotating cutter blade and drive means therefor, said cutter blade having a cutting edge adjacent each end facing in the direction of rotation thereof, a housing over said rotating cutter blade including a depending periphery extending below said rotating cutter blade and having a cut grass outlet therein, and wheel means supporting the lower periphery of said housing at a selected distance above the turf whereby to admit of the cutting of grass by said rotating cutter blade, an annular wire guard disposed over the bottom of the said housing located substantially at the bottom of the depending periphery thereof, said annular guard having its outer periphery substantially coextensive of said housing with the distance between the inner annulus and outer periphery thereof being substantially equal to the length of the cutting edge of said cutter blade, said annular guard including generally circularly disposed wires spaced between the inner and outer peripheries thereof sufficiently to permit blades of grass to be cut to extend upwardly therebetween in the path of the cutting edge of said cutter blade, a pair of spaced arcuate suspension wires fixed to the inner circular wire of said annular guard and at circularly spaced points to the intermediate and outer circular wires thereof, means connecting said suspension wires to the depending peripheral portion of said housing at opposite sides thereof securing said annular guard in taut relationship to said housing, and an arcuate wire guard element including spaced L-shaped members connected radially to and extending above the outer peripheral portion of the annular wire guard at said cut grass outlet in said housing.

5. In a rotary type lawn mower, an annular wire guard as claimed in claim 4 wherein the said suspension wires are looped at their ends, and the said means connecting said suspension wires in taut relationship to the depending peripheral portion of said housing consists of bolt means extending through said loops and fixed to said housing.

6. In a rotary type lawn mower, an annular wire guard as claimed in claim 4 wherein the said suspension wires are looped at their ends, the said means connecting said suspension wires in taut relationship to the depending peripheral portion of said housing consists of anchor blocks secured to and depending from said peripheral portion of said housing apertured to accommodate a bolt, and bolt means extending through the end loops of said suspension wires and said anchor blocks.

References Cited in the file of this patent
UNITED STATES PATENTS

| | | |
|---|---|---|
| 2,601,947 | Buttner | July 1, 1952 |
| 2,656,974 | Holstein | Oct. 27, 1953 |
| 2,906,082 | Mathis | Sept. 29, 1959 |